United States Patent [19]
Minami

[11] Patent Number: 5,347,616
[45] Date of Patent: Sep. 13, 1994

[54] METHOD OF CONTROLLING POSITION AND ATTITUDE OF WORKING ROBOT AND ITS MANIPULATOR AND APPARATUS THEREOF

[75] Inventor: Mamoru Minami, Daito, Japan

[73] Assignee: Tsubakimoto Chain Co., Osaka, Japan

[21] Appl. No.: 787,304

[22] Filed: Oct. 29, 1991

[30] Foreign Application Priority Data

Jan. 28, 1991 [JP] Japan .................................. 3-027874

[51] Int. Cl.$^5$ .............................................. B25J 13/00
[52] U.S. Cl. .................................. 395/86; 364/424.01; 318/568.12; 901/1; 395/80
[58] Field of Search ........................ 395/86, 97; 901/14, 901/15, 16, 1; 180/168; 364/424.02, 424.01; 318/568.12

[56] References Cited

U.S. PATENT DOCUMENTS

| | | | |
|---|---|---|---|
| 4,706,204 | 11/1987 | Hattori | 364/513 |
| 4,746,977 | 5/1988 | White | 358/103 |
| 4,750,123 | 6/1988 | Christian | 364/424 |
| 4,920,500 | 4/1990 | Hetland et al. | 364/513 |
| 4,954,762 | 9/1990 | Miyake et al. | 318/568.19 |
| 5,130,632 | 7/1992 | Ezawa et al. | 318/568.11 |
| 5,157,315 | 10/1992 | Miyake et al. | 318/568.11 |
| 5,204,814 | 4/1993 | Noonan et al. | 364/424.02 |

OTHER PUBLICATIONS

Fu et al., Robotics: Control, Sensing, Vision, and Intelligence, McGraw-Hill, Inc., 1987, 27-48, 82-102.
Muir et al., "Kinematic Modeling of Wheeled Mobile Robots," J. of Robotic Systems, 1987, 281-340.

*Primary Examiner*—Robert W. Downs

[57] ABSTRACT

By a first homogeneous transformation matrix representing a position and orientation of a moving body in an absolute space, and a second homogenous transformation matrix representing a position and attitude of a manipulator in its operating space, position and orientation information of the moving body in the absolute space, and position and attitude information of the manipulator in its operating space are represented by a same representing method, and furthermore, the position and attitude of the manipulator are controlled on the basis of information of a third homogeneous transformation matrix representing the position and attitude of the manipulator including the position and orientation information of the moving body in the absolute space obtained on the basis of the first and second homogeneous transformation matrices. Since information of the third homogenous transformation matrix includes the position and orientation information of the moving body in the absolute space, the manipulator can be controlled at a desired position and attitude in the absolute space irrespective of a condition of traveling on standstill of the moving body, thus it is possible to control the position and attitude of the manipulator for operation while running the moving body.

1 Claim, 6 Drawing Sheets

METHOD OF CONTROLLING POSITION AND ATTITUDE OF WORKING ROBOT AND ITS MANIPULATOR AND APPARATUS THEREOF

BACKGROUND OF THE INVENTION

1. Field of the Invention

The present invention relates to a method of controlling a position and attitude of a manipulator which is mounted on a moving body and conducts various operations and an apparatus thereof. More particularly, it relates to a working robot consisted of the moving body and the manipulator.

2. Description of the Related Art

In order to realize improvement of productivity and securing safety in a factory, various working robots such as a traveling robot and the like, in which an articulated manipulator is mounted on a truck which is a moving body traveling autonomously is in practical use. Such a traveling robot is so designed that it travels autonomously to a working destination and stops by controlling traveling of the truck, and thereafter, the position and attitude of the manipulator are controlled so as to conduct predetermined works.

In the traveling robot, conventionally it was difficult to take traveling information of the truck into the position and attitude control of the manipulator, so that the traveling control of the truck and position and attitude control of the manipulator were executed separately. Specifically, for example, stop positions of the truck are determined in advance responsive to the working positions, and position and attitude control information of the manipulator in a working space restricted by the truck stop position are decided in advance. Thus, when the truck stops at either of the stop positions, the position and attitude of the manipulator are controlled in response to the position and attitude control information restricted by the stop position to execute the predetermined work.

In the conventional traveling robot as aforementioned, however, since the traveling control of the truck and the position and attitude control of the manipulator are executed separately as stated above, it is impossible to control the manipulator to assume an attitude in preparation for the next work while the truck travels. However, information on position and orientation of the truck while traveling are never taken into the position and attitude control of the manipulator. Therefore, in a case where complicated work is to be carried out actually in the working position, after the truck is stopped at the predetermined stop position, the position and attitude of the manipulator are controlled responsive to the stop position to execute the predetermined work. Thus, it is actually impossible to work the manipulator while the truck is traveling, resulting in low working efficiency.

SUMMARY OF THE INVENTION

The present invention has been devised in view of such circumstances, therefore, it is a primary object thereof to provide a method of controlling a position and attitude of a working robot and its manipulator and an apparatus thereof, whereby it is possible to work by controlling the position and attitude of the manipulator while a truck is traveling to improve the working efficiency.

The method of controlling the position and attitude of the manipulator according to the present invention is the method of controlling the position and attitude of the manipulator which is mounted on a moving body and conducts various operations, and comprises: a step for obtaining a first homogeneous transformation matrix representing a position and orientation of the moving body in an absolute space; a step for obtaining a second homogeneous transformation matrix representing a position and attitude of the manipulator in its operating space; a step for obtaining a third homogeneous transformation matrix representing a position and attitude of the manipulator including position and orientation information of the moving body in the absolute space on the basis of the first and second homogeneous transformation matrices; and a step for controlling a position and attitude of the manipulator on the basis of information of the third homogeneous transformation matrix.

A position and attitude controlling apparatus of the manipulator according to the present invention is mounted on the moving body, for controlling the position and attitude of the manipulator which conducts various operations, and includes first matrix means for obtaining the first homogeneous transformation matrix representing the position and orientation of the moving body in the absolute space; second matrix means for obtaining the second homogeneous transformation matrix representing the position and attitude of the manipulator in its operating space; third matrix means for obtaining the third homogeneous transformation matrix representing the position and attitude of the manipulator including the position and orientation information of the moving body in the absolute space, in response to the homogeneous transformation matrices obtained by the first and second means; and controlling means for controlling the position and attitude of the manipulator on the basis of information of the homogeneous transformation matrix obtained by the third matrix means.

A working robot of the present invention comprises: a moving body which travels autonomously; a manipulator which is mounted on the moving body and conducts various operations and a control device: having, in order to control the position and attitude of the manipulator, first matrix means for obtaining the first homogeneous transformation matrix representing the position and orientation of the moving body in the absolute space; second matrix means for obtaining the second homogeneous transformation matrix representing the position and attitude of the manipulator in its operating space; third matrix means for obtaining the third homogeneous transformation matrix representing the position and attitude of the manipulator including the position and orientation information of the moving body in the absolute space, on the basis of the homogeneous transformation matrices obtained by the first and second means; and controlling means for controlling the position and attitude of the manipulator on the basis of information of the homogeneous transformation matrix obtained by the third matrix means.

Here, the absolute space is the space represented by an absolute coordinate system which is set independently of the moving body and manipulator. The homogeneous transformation matrix is a 4×4 matrix which represents a position, orientation and attitude of the other coordinate system origin observed from one coordinate system origin between the two coordinate system origins.

In the present invention, by obtaining the first homogeneous transformation matrix representing the position and orientation of the moving body in the absolute space, and the second homogeneous transformation matrix representing the position and attitude of the manipulator in its operating space, position and orientation information of the moving body in the absolute space and position and attitude information of the manipulator in its operating space can be obtained by a same representation method. On the basis of the first and second homogeneous transformation matrices, the third homogeneous transformation matrix representing the position and attitude of the manipulator including the position and orientation information of the moving body in the absolute space is obtained, and on the basis of the third homogeneous transformation matrix, the position and attitude of the manipulator are controlled. Since information of the third homogeneous transformation matrix includes the position and orientation information of the moving body in the absolute space, irrespective of traveling or standstill condition of the moving body, the position and attitude of the manipulator are controlled to be desired ones.

The above and further objects and features of the invention will more fully be apparent from the following detailed description with accompanying drawings.

DESCRIPTION OF THE PREFERRED EMBODIMENTS

In the following, the present invention will be specifically described with reference to the drawings showing the embodiments.

Figure 1:
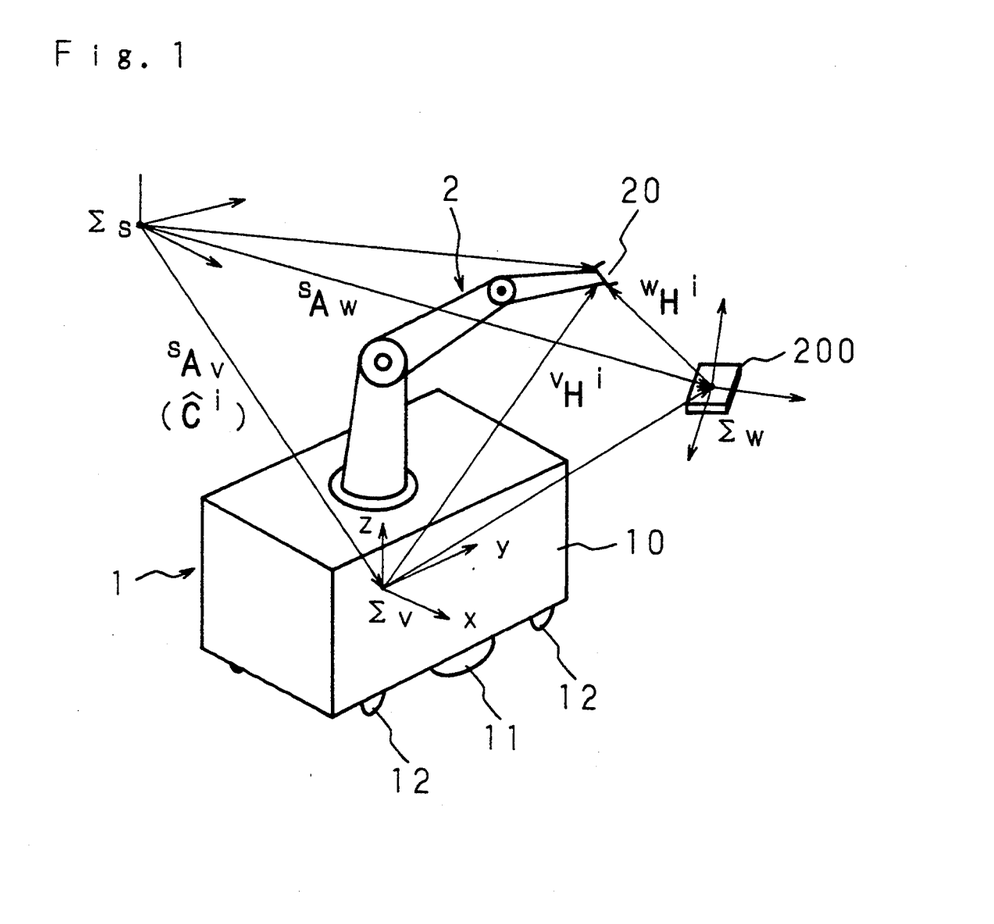
FIG. 1 is a perspective view of a working robot used for embodying a method of controlling position and attitude of a manipulator according to the present invention.

FIG. 1 is a perspective view of a traveling robot into which a position and attitude control method of a manipulator according to the present invention is embodied.

In the figure, reference numeral 1 designates a truck which is a moving body traveling autonomously. The truck 1 has its box-type truck body 10 supported by a pair of right and left driving wheels 11, 11 (only right driving wheel is shown) and casters 12, 12, 12, 12 (only two are shown) disposed in front, rear, right and left. The left driving wheel 11 and the right driving wheel 11 are driven independently by separate motors (not shown). On the left driving wheel 11 and the right driving wheel 11, proceeding speed detectors (not shown) consisting of pulse generators which oscillate a pulse signal responsive to their revolutions are disposed respectively.

On the upper portion of the truck body 10 of the truck 1, an articulated manipulator 2 having a hand effectuator 20 on its apex is provided. On each knuckle of the manipulator 2, an angle detector (not shown) for detecting the knuckle angle is disposed.

In the figure, a symbol $\Sigma_s$ indicates an absolute coordinate system set at any point (e.g. any point on the floor surface) independently of the truck 1 and the manipulator 2, a symbol $\Sigma_v$ indicates a moving coordinate system set on the truck 1, and a symbol $\Sigma_w$ indicates a working coordinate system set on a piece 200 to be worked for representing the position and attitude of the piece 200 to be worked.

First, a method of representing the position and orientation of a traveling robot constructed as stated above in matrices will be described. Here, it is assumed that the traveling robot is running in a two-dimensional plane.

A velocity $\dot{r}$ of the truck 1 base on the absolute coordinate system $\Sigma_s$ shown in FIG. 1 is represented as the following Equation (1) by a velocity $\dot{x}$ in an x-axis direction, a velocity $\dot{y}$ in a y-axis direction and a rotating angular velocity $\dot{\theta}$.

$$\dot{r} = [\dot{x}, \dot{y}, \dot{\theta}]^T \qquad (1)$$

Also, proceeding velocity $v_L$, $v_R$ of the left driving wheel 11 and the right driving wheel 11 are represented by a transposed matrix as the following Equation (2).

$$v = [v_L \ v_R]^T \qquad (2)$$

From Equations (1) and (2), the velocity $\dot{r}$ of the truck 1 is represented by using a matrix as the following Equation (3).

$$\dot{r} = J_v(\theta) \, v \qquad (3)$$

Where, a matrix $J_v(\theta)$ in Equation (3) is represented by a matrix as shown in the following Equation (4). In addition, T represents tread in Equation (4) and following equations.

$$J_v(\theta) = \begin{bmatrix} -\frac{1}{2}\sin\theta & -\frac{1}{2}\sin\theta \\ \frac{1}{2}\cos\theta & \frac{1}{2}\cos\theta \\ -\frac{1}{T} & \frac{1}{T} \end{bmatrix}. \qquad (4)$$

A symbol $\theta$ in Equation (3) indicates an angle when the y-axis direction of the absolute coordinate system $\Sigma_s$ is 0 and a counterclockwise rotating direction is positive.

Next, a position and orientation of the truck 1 of the traveling robot in the absolute coordinate system $\Sigma_s$ is obtained.

The position and orientation $r^i$ of the truck 1 of the traveling robot is obtained as the following Equation (5), by integrating both sides of Equation (3) with the position and orientation $r^{i-1}$ at time $(i-1)\tau$ as an initial value, when its control period is $\tau$.

$$r^i = r^{i-1} + \int_0^\tau J_v(\theta) v \, dt \qquad (5)$$

$$= r^{i-1} + \int_0^\tau \begin{bmatrix} -v\sin\theta \\ v\cos\theta \\ \omega \end{bmatrix} dt$$

Here, v and $\theta$ in Equation (5) are obtained as the following Equations (6) and (7).

$$v = \frac{v_R + v_L}{2} \qquad (6)$$

$$\omega = \dot\theta = \frac{v_R - v_L}{T} \qquad (7)$$

A velocity $v^i$ and rotating angular velocity $\omega^i$ of the truck 1 at time i$\tau$ can be obtained by using the aforesaid Equations (6) and (7) on the basis of a value obtained by a sample-holding the respective proceeding velocities of the left driving wheel 11 and the right driving wheel 11 for $\tau$ seconds from the time (i−1) $\tau$.

v and $\theta$ in an integral term of Equation (5) are arbitrary time functions decided as the truck 1 travels, so that they can not be integrated analytically. Therefore, the integral term of Equation (5) is obtained by a geometric approximate calculation by operational equations as shown in the following Equations (8) to (10), using a geometric approximate calculating method as shown in "A method of measuring the Present Position and Proceeding Orientation of a Moving Body" by Tsumura et al, PP1153–1160, Japan Machinery Association, Papers Vol. 47, No. 421(1981).

$$\hat{r}^i = \hat{r}^{i-1} + \Delta\hat{r}^i \qquad (8)$$

$$\Delta\hat{r}^i = \begin{bmatrix} -\hat{v}^i \tau \sin(\hat\theta^{i-1} + \Delta\hat\theta^i/2) \\ \hat{v}^i \tau \cos(\hat\theta^{i-1} + \Delta\hat\theta^i/2) \\ \Delta\hat\theta^i \end{bmatrix} \qquad (9)$$

$$\Delta\hat\theta^i = \hat\omega^i \tau \qquad (10)$$

Here, since Equation (8) is for obtaining the integral term of Equation (5) approximately, some errors are involved, so that in order to indicate it clearly, a hat symbol " ^ " is added to variables in Equations (8) to (10).

Next, a preparatory calculation method for taking position and orientation information of the truck 1 obtained by the method aforementioned into the position and attitude control of the manipulator 2 will be described.

In the case where the position and attitude of an articulated link mechanism such as the manipulator 2 are to be represented, it is known that position and attitude information of one knuckle is represented by a 4×4 matrix, and by multiplying the 4×4 matrix representing position and attitude information of respective knuckles, the position and attitude information of the knuckles are obtained. Therefore, in order to take the position and orientation information of the truck 1 into the position and attitude control of the manipulator 2, it is necessary to represent the position and orientation information of the truck 1 by the 4×4 matrix.

At first, When a matrix in which $r^{i-1}$ in Equation (8) is represented by a homogeneous transformation expression is $\hat{C}^{i-1}$, its homogeneous transformation matrix ($\hat{C}^{i-1}$) is represented by a 4×4 matrix as shown in the following Equation (11).

$$\hat{C}^{i-1} = \begin{bmatrix} \cos\hat\theta^{i-1} & -\sin\hat\theta^{i-1} & 0 & \hat{x}^{i-1} \\ \sin\hat\theta^{i-1} & \cos\hat\theta^{i-1} & 0 & \hat{y}^{i-1} \\ 0 & 0 & 1 & 0 \\ 0 & 0 & 0 & 1 \end{bmatrix} \qquad (11)$$

Similarly, when a matrix in which $\hat{r}^i$ in Equation (8) is represented by a homogeneous transformation expression is $\hat{C}^i$, its homogeneous transformation matrix ($\hat{C}^i$) is represented by, as shown in Equation (12), an equation obtained by multiplying $\hat{C}^{i-1}$ by a homogeneous transformation matrix ($\Delta\hat{C}^i$) representing a variation of position and orientation of the truck 1.

$$\hat{C}^i = \hat{C}^{i-1} \cdot \Delta\hat{C}^i \qquad (12)$$

Here, $\Delta\hat{C}^i$ in Equation (12) is represented by a homogeneous transformation matrix as shown in the following Equation (13).

$$\Delta\hat{C}^i = \begin{bmatrix} \cos\Delta\hat\theta^i & -\sin\Delta\hat\theta^i & 0 & \Delta\hat{x}^i \\ \sin\Delta\hat\theta^i & \cos\Delta\hat\theta^i & 0 & \Delta\hat{y}^i \\ 0 & 0 & 1 & 0 \\ 0 & 0 & 0 & 1 \end{bmatrix} \qquad (13)$$

Here, $\Delta\hat{x}^i$ in Equation (13) is represented geometrically by the following Equation (14), and $\Delta\hat{y}^i$ in Equation (13) is represented geometrically by Equation (15).

$$\Delta\hat{x}^i = -\hat{v}^i \tau \sin(\Delta\hat\theta^i/2) \qquad (14)$$

$$\Delta\hat{y}^i = \hat{v}^i \tau \sin(\Delta\hat\theta^i/2) \qquad (15)$$

Thus, when an estimated value of initial position and orientation of the truck 1 is $\hat{C}^0$, $\hat{C}^i$ can be obtained by, as shown in the following Equation (16), multiplying $\hat{C}^0$ by $\Delta\hat{C}^p$ (where, P=1 to i) which is a variation of position and orientation of the truck 1.

$$\hat{C}^i = \hat{C}^0 \prod_{P=1}^{i} \Delta\hat{C}^P \qquad (16)$$

The position and orientation of the truck 1 on the absolute coordinate system $\Sigma_s$ is represented by a transformation matrix from the moving coordinate system $\Sigma_v$ to the absolute coordinate system $\Sigma_s$. That is, the transformation matrix $^sA_v{}^i$ aforementioned represents a position and orientation of the moving coordinate system $\Sigma_v$ viewed from the absolute coordinate system $\Sigma_s$. Since there is a cumulative error $\delta C^i$ caused by sample-holding of the velocity V and rotating angular velocity $\omega$ of the truck 1 and effects of the running road condition of the truck 1 in an estimated value of the position and orientation of the truck 1, the transformation matrix $^sA_v{}^i$ is represented as a product of $\hat{C}^i$ and the cumulative error $\delta C^{-i}$, as shown in the following Equation (17).

$$^sA_v{}^i = \hat{C}^i \delta C^i \qquad (17)$$

The cumulative error $\delta C^i$ can be obtained from the following Equation (18) as a product of the transformation matrix ${}^sA_v{}^i$ and an inverse matrix of $\hat{C}^i$, only when the transformation matrix ${}^sA_v{}^i$ is observed.

$$\delta C^i = (\hat{C}^i)^{-1} {}^sA_v{}^i \tag{18}$$

In the case where a traveling distance of the truck 1 is short to the extent that the cumulative error $\delta C^i$ can be assumed to be infinitesimal, $\delta C^i$ can be approximated with a unit matrix I. Thus, in such a case, as shown by the following Equation (19), the transformation matrix ${}^sA_v{}^i$ and $\Delta \hat{C}^i$ may be represented as substantially equal.

$$ {}^sA_v{}^i \doteq \hat{C}^i \tag{19}$$

Next, a position and attitude control method of the manipulator 2 will be described. When attitude vectors of the hand effectuator 20 of the manipulator 2 are vector n, vector o and vector $a \in R^3$ (here, $R^3$ is three-element of real number), and a position vector is $p \in R^3$, a homogeneous transformation matrix H representing the position and attitude of the hand effectuator 20 becomes a matrix as shown in the following Equation (20).

$$H = \begin{bmatrix} n & o & a & p \\ 0 & 0 & 0 & 1 \end{bmatrix} \tag{20}$$

A homogeneous transformation matrix ${}^vH^i$ representing the position and attitude of the hand effectuator 20 at time $i\tau$ it represented relative to the moving coordinate system $\Sigma_v$ is, when a knuckle angle vector of respective knuckles of the manipulator 2 is $q^i \in R^n$ ($q^i$ is an n-element vector of real number), represented as a function of-knuckle angle vector $q^i$ as shown in the following Equation (21) from a forward kinematics of the manipulator 2.

$${}^vH^i = F(q^i) \tag{21}$$

When a transformation matrix of the hand effectuator 20 from the absolute coordinate system $\Sigma_s$ to the working coordinate system $\Sigma_w$ is ${}^wA_s$, a homogeneous transformation matrix ${}^wH^i$ representing the position and attitude of the hand effectuator 20 at time $i\tau$ represented relative to the working coordinate system $\Sigma_w$ is represented as a product of the transformation matrix ${}^wA_s$, aforesaid $\hat{C}^i$ and the homogeneous transformation matrix ${}^vH^i$ as shown in the following Equation (22).

$${}^wH^i = {}^wA_s \hat{C}^i {}^vH^i \stackrel{\Delta}{=} \begin{bmatrix} {}^wn^i & {}^wo^i & {}^wa^i & {}^wp^i \\ 0 & 0 & 0 & 1 \end{bmatrix} \tag{22}$$

An error vector ${}^w\Theta^i$ representing an error from an instruction value of the position and attitude of the hand effectuator 20 at time $i\tau$, represented relative to the working coordinate system $\Sigma_w$ is represented by a matrix as shown in the following Equation (23).

$$ {}^we^i = \begin{bmatrix} {}^we_d{}^i \\ {}^we_s{}^i \end{bmatrix} \tag{23}$$

$$= \begin{bmatrix} {}^wp_d{}^i - {}^wp_I{}^i \\ ({}^wn_d{}^i \times {}^wn^i + {}^wo_d{}^i \times {}^wo^i + {}^wa_d{}^i \times {}^wa^i)/2 \end{bmatrix}$$

The instruction value of the new position and attitude obtained by taking into consideration of the error vector ${}^w\Theta^i$ thus represented is obtained by the following Equation (24). Here, $\Delta {}^wH^i$ in Equation (24) is a matrix as shown in Equation (25).

$${}^wH_{r}{}^i = {}^wH^i + \Delta {}^wH^i \tag{24}$$

$$\Delta {}^wH^i = \begin{bmatrix} {}^wn^i \times {}^we_a{}^i & {}^wo^i \times {}^we_a{}^i & {}^wa^i \times {}^we_a{}^i & {}^we_b{}^i \\ 0 & 0 & 0 & 0 \end{bmatrix} \tag{25}$$

The instruction value of the position and attitude obtained by Equation (24) can be represented by an instruction value of the position and attitude based on the moving coordinate system $\Sigma_v$ as shown in the following Equation (27), by using a transformation matrix as shown in the following Equation (26).

$${}^vA_w{}^i = (\hat{C}^i)^{-1} {}^sA_w \tag{26}$$

$${}^vH_r{}^i = {}^vA_w{}^i {}^wH_r{}^i \tag{27}$$

Instruction values of the knuckle angle vectors of respective knuckles of the manipulator 2 are obtained by an inverse function $F^{-1}$ as shown in the following Equation (28), by a backward kinematics of the manipulator 2.

$$q_r{}^{i+1} = F^{-1}({}^vH_r{}^i) \tag{28}$$

Next, a configuration of control system for controlling a position and attitude of the manipulator 2 as aforementioned will be described.

Figure 2:
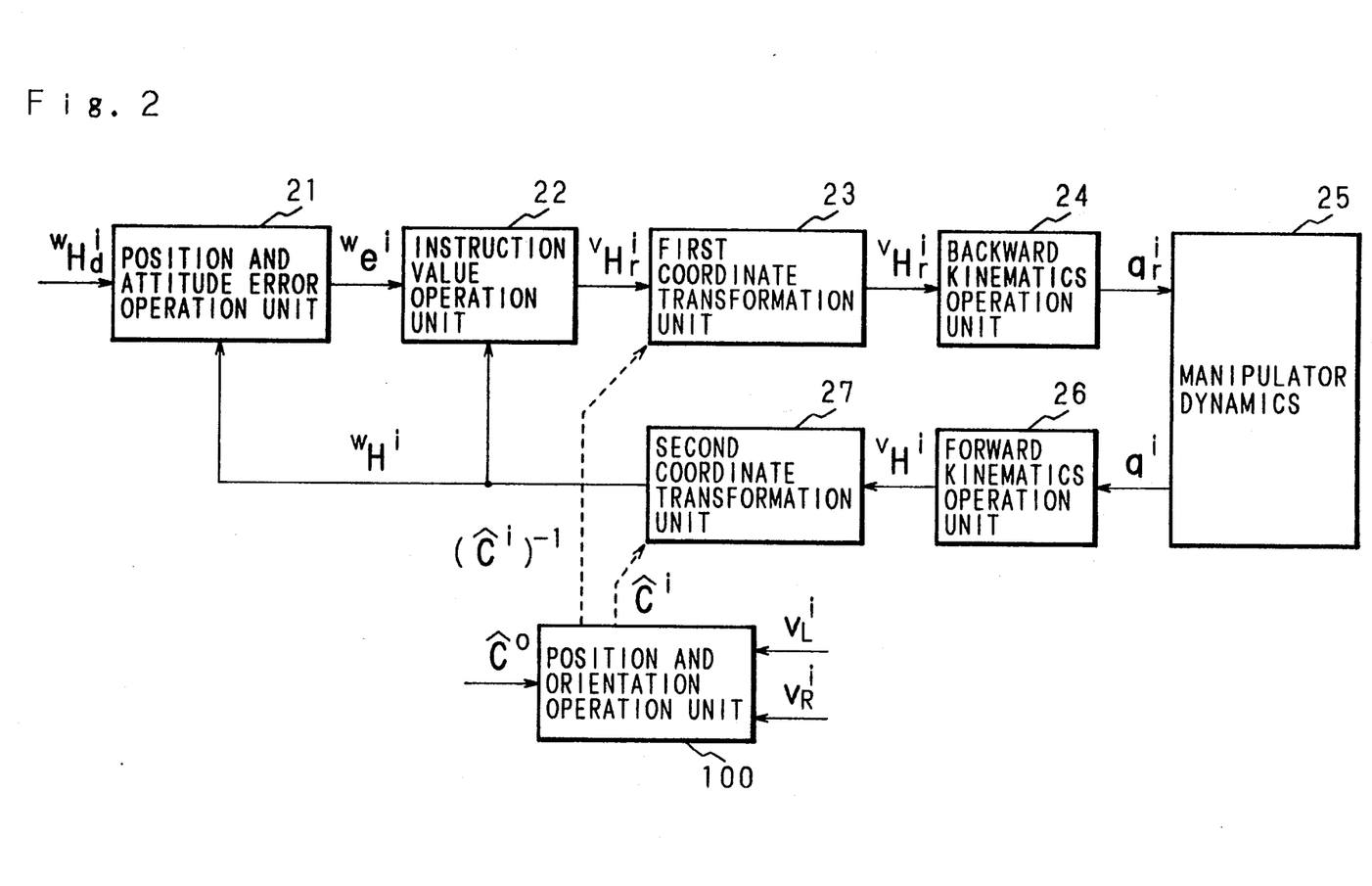
FIG. 2 is a schematic block diagram of a control system for controlling the position and attitude of a manipulator.

FIG. 2 is a schematic block diagram of a control system for controlling the position and attitude of the manipulator 2.

In the figure, reference numeral 25 designates a manipulator dynamics including a servo-system. The manipulator dynamics 25 is a block which represents an actual motion with instruction value of the knuckle vectors of respective knuckles of the manipulator 2 as an input, and outputs knuckle angle vector $q^i$ representing the operating state of respective knuckles. The knuckle angle vector $q^i$ is given to a forward kinematics operation unit 26 from the manipulator dynamics 25.

In the forward kinematics operation unit 26, on the basis of the given knuckle angle vector $q^i$, a homogeneous transformation matrix ${}^vH^i$ representing the position and attitude at time $i\tau$ is obtained by using Equation (21), and the data is given to a second coordinate transformation unit 27.

To a position and orientation operation unit 100 for obtaining the position and orientation of the truck 1, data of a proceeding velocity $v_L$ of the left driving wheel 11, a proceeding speed $v_R$ of the right driving wheel 11 and initial position and orientation estimated value ($\hat{C}^0$) of the truck 1 are given, and in the position and orientation operation unit 100, on the basis of the data, the homogeneous transformation matrix ($\hat{C}^i$) representing the position and orientation of the truck 1 and its inverse matrix ($\hat{C}^i$)$^{-1}$ are obtained by the using Equation (16), and the former data is given to the second coordinate transformation unit 27 and the latter data is given to the first coordinate transformation unit 23.

In the second coordinate transformation unit 27, on the basis of the given homogeneous transformation matrix $^vH^i$ and homogeneous transformation matrix ($\hat{C}^i$), a homogeneous transformation matrix $^wH^i$ representing the position and attitude of the hand effectuator 20 at time i$\tau$, represented relative to the absolute coordinate system $\Sigma_w$ is obtained by using Equation (22). Data of the homogeneous transformation matrix $^wH^i$ obtained here is given to a position and attitude error operation unit 21 and an instruction value operation unit 22.

To the position and attitude error operation unit 21, a homogeneous transformation matrix $^wH_d^i$ representing the instruction value of position and attitude control of the hand effectuator 20 is given. In the position and attitude error operation unit 21, on the basis of the homogeneous transformation matrix $^wH_d^i$ representing the instruction value and homogeneous transformation matrix $^wH^i$, an error vector $^we^i$ is obtained by using Equation (23). Data of the error vector $^we^i$ obtained here is given to the instruction value operation unit 22.

In the instruction value operation unit 22, on the basis of the given error vector $^we^i$ and homogeneous transformation matrix $^wH_i$, a homogeneous transformation matrix $^wH_r^i$ representing the instruction value of a new position and attitude obtained by taking into consideration of the error vector $^we^i$ is obtained by using Equations (24) and (25). Data of the homogeneous transformation matrix obtained here is given to the first coordinate transformation unit 23.

In the first coordinate transformation unit 23, on the basis of the homogeneous transformation matrix $^wH_r^i$ representing the instruction value of a new position and attitude given and an inverse matrix of the homogeneous transformation matrix ($\hat{C}^i$), a homogeneous transformation matrix representing the instruction value of the position and attitude based on the moving coordinate system $\Sigma_v$ is obtained by using Equations (26) and (27). Data of the homogeneous transformation matrix obtained here is given to a backward kinematics operation unit 24. In the backward kinematics operation unit 24, on the basis of the given data, an instruction value of the knuckle angle vector of respective knuckles of the manipulator 2 is obtained by using Equation (28), and the instruction value of the knuckle angle vector of respective knuckles obtained is given to the servo-system of respective knuckles in the manipulator dynamics 25. Then, the manipulator 2 is driven according to the given instruction value.

Next, results of simulation experiments on controlling a manipulator using the position and attitude control method of the manipulator as aforementioned will be described.

Figure 3:
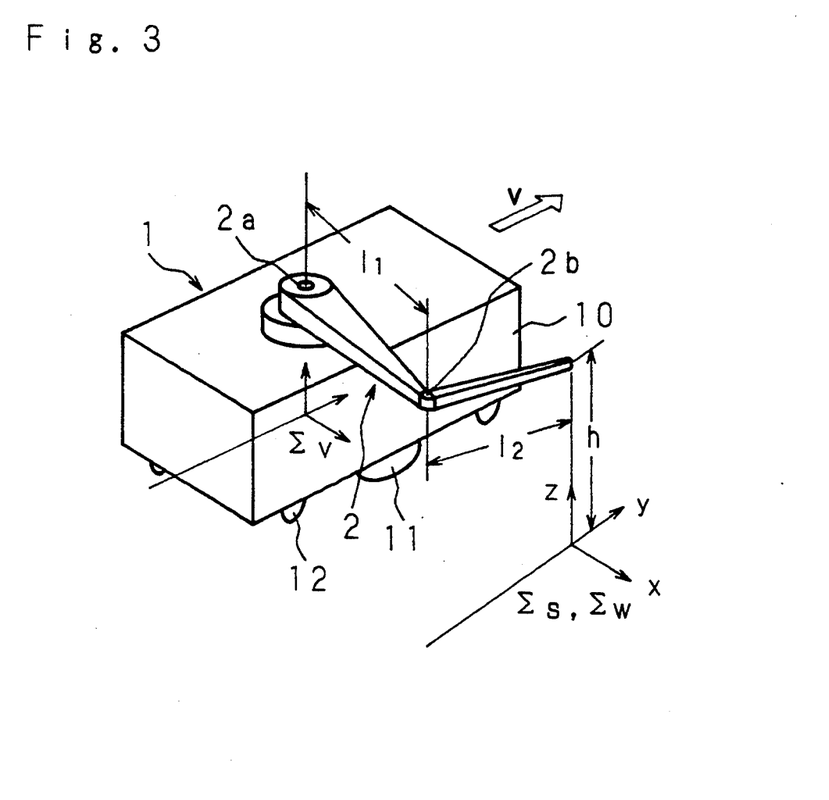
FIG. 3 is a perspective view showing a configuration of a traveling robot used in a simulation experiment.
Figure 4:
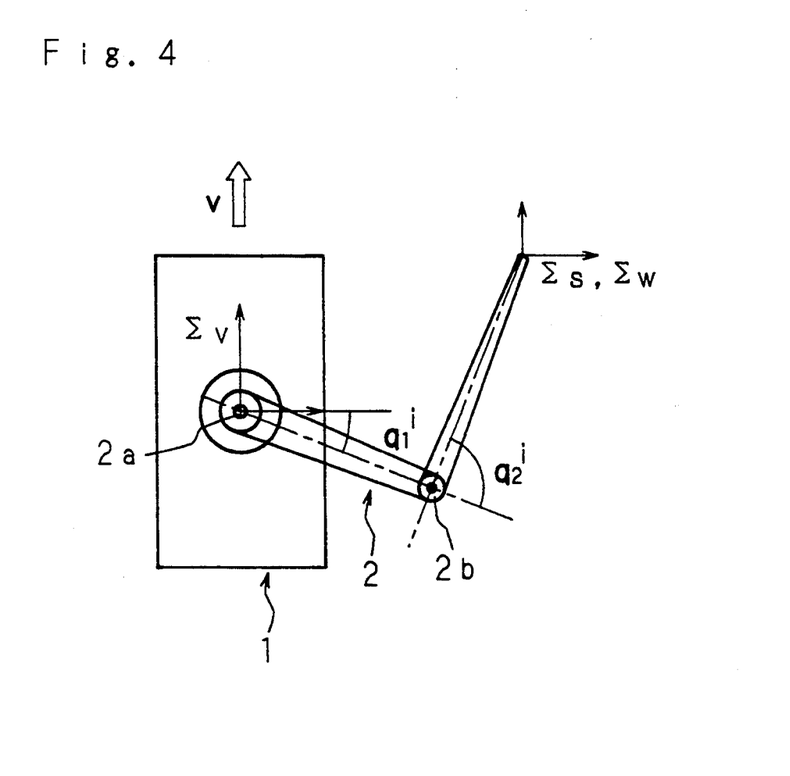
FIG. 4 is a plan view of a traveling robot used in a simulation experiment.

FIG. 3 is a perspective view showing a configuration of a traveling robot used in the simulation experiment, and FIG. 4 is a plan view of the traveling robot. In FIG. 3 and FIG. 4, parts similar to FIG. 1 are designated by the same reference characters and their explanation is omitted.

The traveling robot includes a 2-link type manipulator 2 which operates in an x-y plane with a first knuckle 2a and a second knuckle 2b as rotating centers. In this case, the homogeneous transformation matrix $^vH^i$ representing the position and attitude of the hand effectuator 20 at time i$\tau$, represented relative to the moving coordinate system $\Sigma_v$ represented by Equation (21) is represented by a matrix as shown in the following Equation (29).

$$^vH^i = \begin{bmatrix} \cos(q_1^i + q_2^i) & -\sin(q_1^i + q_2^i) & 0 & l_1\cos q_1^i + l_2\cos(q_1^i + q_2^i) \\ \sin(q_1^i + q_2^i) & \cos(q_1^i + q_2^i) & 0 & l_1\sin q_1^i + l_2\sin(q_1^i + q_2^i) \\ 0 & 0 & 1 & h \\ 0 & 0 & 0 & 1 \end{bmatrix} \quad (29)$$

note,
$l_1$: length from first knuckle to second knuckle
$l_2$: length from second knuckle to edge of manipulator
$q_1^i$: knuckle angle of first knuckle
$q_2^i$: knuckle angle of second knuckle When the working coordinate system $\Sigma_w$ is consisted with the absolute coordinate system $\Sigma_s$ for simplifying the description, transformation matrices $^wA_s$ and $^sA_w$ become a unit matrix I, so that the homogeneous transformation matrix $^wH^i$ shown in Equation (22) is represented by a matrix as shown in the following Equation (30).

$$^wH^i = \hat{C}^i \, ^vH^i = \begin{bmatrix} \cos(q_1^i + q_2^i) & -\sin(q_1^i + q_2^i) & 0 & -S_x + l_1\cos q_1^i + l_2\cos(q_1^i + q_2^i) \\ \sin(q_1^i + q_2^i) & \cos(q_1^i + q_2^i) & 0 & -S_y + v_i + l_1\sin q_1^i + l_2\sin(q_1^i + q_2^i) \\ 0 & 0 & 1 & h \\ 0 & 0 & 0 & 1 \end{bmatrix} \quad (30)$$

Since the manipulator 2 can only indicate the position in the x-y plane of z=h, a measured value was given as a target value other than (x, y) coordinates. As target positions of (x, y), a fixed point which does not move temporally is set and an origin of the working coordinate $\Sigma_w$ was selected. The instructed position and attitude of the manipulator 2 is represented by a matrix as shown in the following Equation (31).

$$^wH_d^i = \begin{bmatrix} \cos(q_1^i + q_2^i) & -\sin(q_1^i + q_2^i) & 0 & 0 \\ \sin(q_1^i + q_2^i) & \cos(q_1^i + q_2^i) & 0 & 0 \\ 0 & 0 & 1 & h \\ 0 & 0 & 0 & 1 \end{bmatrix} \quad (31)$$

Thus, the error vector $^we^i$ as shown in Equation (23) is represented by a matrix as shown in the following Equation (32).

$$^we^i = [S_x - l_1 \cos q_1^i - l_2 \cos(q_1^i + q_2^i), S_y - v_i - l_1 \sin q_1^i - l_2 \sin(q_1^i + q_2^i), 0, 0, 0, 0] \quad (32)$$

Then, an instruction value of the knuckle angle vector is obtained by using Equation (28) and outputted to the servo-system of the manipulator 2. It is assumed that a time constant of the first knuckle of the manipulator 2 is 0.2 second, a time constant of the second knuckle is 0.1 second and a cumulative error $\delta C^i$ of position and orientation estimated value of the truck 1 is a unit matrix I.

For a traveling robot having these conditions, the following first and second experiments were carried out.

Figure 5:
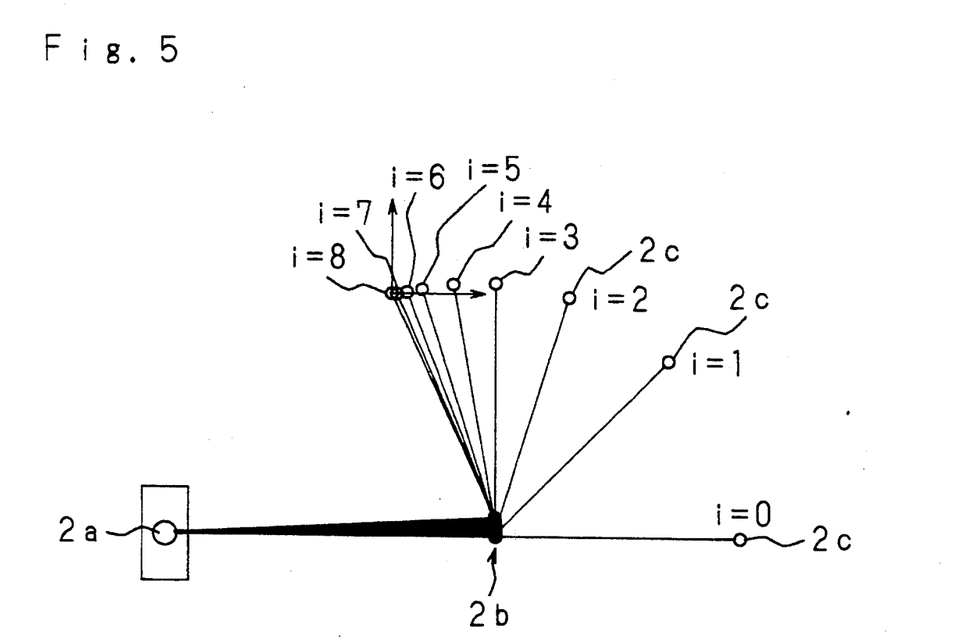
FIG. 5 is a plan view of the neighborhood of a traveling robot showing experiment results of a first experiment.
Figure 6:
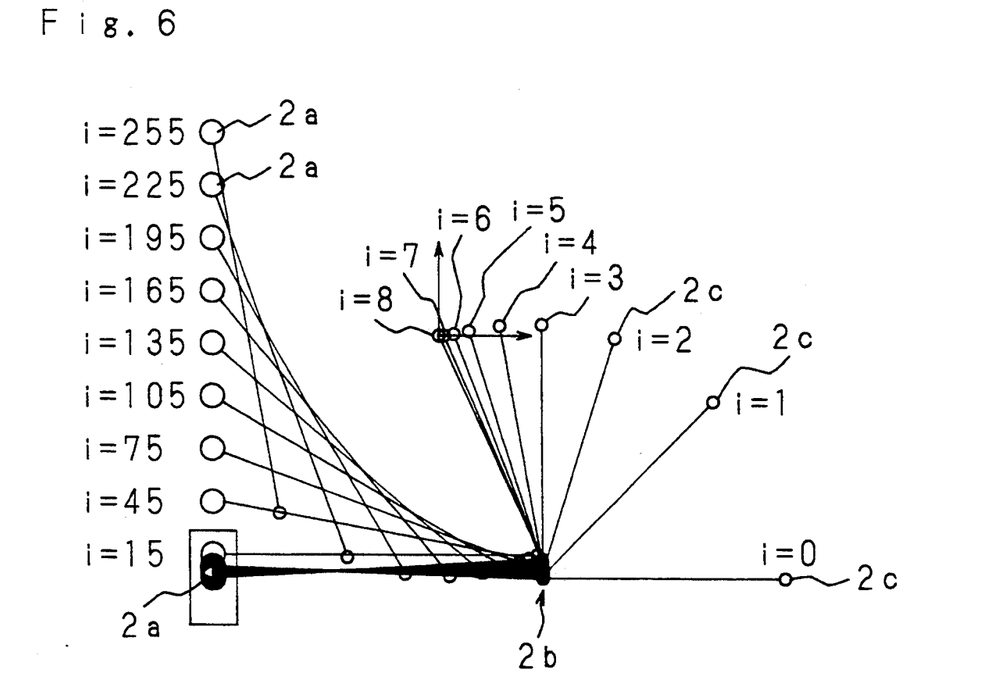
FIG. 6 is a plan view of the neighborhood of a traveling path of a traveling robot showing experiment results of a second experiment.

In the first experiment, a response of the manipulator was observed while the traveling robot was standing still. FIG. 5 is a plan view of the neighborhood of the traveling robot showing the first experiment result, in which the operation of the manipulator 2 with time is shown.

In FIG. 5, reference character 2a designates a first knuckle of the manipulator 2, 2b designates a second knuckle of the manipulator 2 and 2c designates an edge position of the manipulator 2. As is apparent from FIG. 5, when the traveling robot is standing still, the same result as the case where the manipulator is fixed can be obtained.

In the second experiment, a response of the manipulator 2 in the case where the truck i is driven at a velocity of 4 m/min was checked. FIG. 8 is a plan view of the neighborhood of a traveling path of the traveling robot showing the second experiment result, in which the operation of the manipulator 2 with the passage of time is shown.

As it is apparent from FIG. 8, it is observed that the control of the manipulator 2 with movement taken into consideration is conducted.

As such, in the position and attitude control method of the manipulator of the present invention, since the position and attitude of the manipulator 2 is controlled during the traveling of the truck 1, in the case where of loading and unloading baggages, for example, it can be performed by the manipulator 2 while running the truck 1.

In this embodiment, though the traveling information of the truck 1 is designed to be detected by the truck 1 itself, it is not limited thereto, in the case where the manipulator 2 of the traveling robot wherein the manipulator 2 is mounted on the truck 1 which is guided by guidance of guiding means is controlled, traveling information may be obtained from the guiding means.

As described particularly hereinabove, in the position and attitude control method and its apparatus of the working robot and its manipulator according to the present invention, by a first homogeneous transformation matrix representing the position and orientation of a moving body in an absolute space, and a second homogenous transformation matrix representing the position and attitude of a manipulator in its operating space, position and orientation information of the moving body in the absolute space and position and attitude information of the manipulator in its operating space are represented by the same representation method, and the position and attitude of the manipulator is controlled on the basis of information of a third homogeneous transformation matrix, representing the position and attitude of the manipulator including the position and orientation information of the moving body in the absolute space obtained on the basis of the first and second homogeneous transformation matrices.

Information of the third homogeneous transformation matrix includes the position and orientation information of the moving body in the absolute space, and since the manipulator can be controlled at a desired position and attitude in the absolute space irrespective of condition of the moving body, traveling or standstill, the position and attitude of the manipulator can be controlled for operation while the moving body is traveling, so that the present invention is efficacious in improving the working efficiency.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A control system for controlling the position and attitude of a manipulator which is mounted on a moving body comprising an autonomously-traveling truck defining a moving coordinate system which is fixed with respect to said autonomously-traveling truck, said manipulator including a plurality of knuckles and a mechanical hand and which conducts various operations, comprising:

a position and attitude error operation unit for receiving first instruction values representing the desired position and attitude of the hand, for receiving values representing the actual position and attitude of the hand, and for outputting error values representing the disparity between said desired position and said actual position;

an instruction value operation unit, coupled to said position and attitude error operation unit, for receiving said error values, for receiving said values representing the actual position of the hand, and for outputting second instruction values representing a new position and attitude;

a first coordinate transformation unit, coupled to said instruction value operation unit, for receiving said second instruction values, for receiving a first matrix which is the inverse of a second matrix representing the position and orientation of said truck, and for outputting a third matrix representing position and attitude instruction values based on said moving coordinate system;

a backward kinematics operation unit, coupled to said first coordinate transformation unit, for receiving said third matrix and outputting a first set of knuckle angle vectors;

a servo-system, coupled to said backward kinematics operation unit, for receiving said first set of knuckle angle vectors and outputting a second set of knuckle angle vectors representing the operating state of respective knuckles;

a forward kinematics operation unit, coupled to said servo-system, for receiving said second set of knuckle angle vectors and outputting a fourth matrix representing position and attitude of said manipulator;

a second coordinate transformation unit, coupled to said forward kinematics operation unit, for receiving said fourth matrix and said second matrix and outputting said values representing the actual position and attitude of the hand; and a position and orientation operation unit, coupled to said first and second coordinate transformation units, for receiving initial position and orientation estimated values of said truck and truck driving information and outputting said first and second matrices.

* * * * *